United States Patent
Zhang et al.

(10) Patent No.: US 11,290,578 B2
(45) Date of Patent: Mar. 29, 2022

(54) ENCAPSULATING AND EXCHANGING BYTES IN A TELECOMMUNICATION SYSTEM

(71) Applicant: HUAWEI TECHNOLOGIES CO., LTD., Guangdong (CN)

(72) Inventors: Xiaojun Zhang, Shenzhen (CN); Wenhua Du, Dongguan (CN); Shuai Xiao, Wuhan (CN); Min Zha, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 16/802,977

(22) Filed: Feb. 27, 2020

(65) Prior Publication Data
US 2020/0204660 A1 Jun. 25, 2020

Related U.S. Application Data

(63) Continuation of application No. PCT/CN2018/100322, filed on Aug. 14, 2018.

(30) Foreign Application Priority Data
Aug. 28, 2017 (CN) .......................... 201710749377.0

(51) Int. Cl.
*H04L 29/08* (2006.01)
*H04L 69/324* (2022.01)

(52) U.S. Cl.
CPC ................. *H04L 69/324* (2013.01)

(58) Field of Classification Search
CPC ... H04L 69/324; H04L 12/28; H04L 12/4633; H04L 2012/40208
See application file for complete search history.

(56) References Cited

U.S. PATENT DOCUMENTS

| 6,317,433 B1 | 11/2001 | Galand et al. |
| 7,869,468 B1 | 1/2011 | Giannakopoulos et al. |
(Continued)

FOREIGN PATENT DOCUMENTS

| CN | 101414922 A | 4/2009 |
| CN | 101783772 A | 7/2010 |
(Continued)

OTHER PUBLICATIONS

Extended European Search Report issued in European Application No. 18850781.8 dated Jul. 29, 2020, 7 pages.
(Continued)

*Primary Examiner* — Mohamed A. Wasel
(74) *Attorney, Agent, or Firm* — Fish & Richardson P.C.

(57) ABSTRACT

An example exchange method includes: receiving, through a first interface, M bits; after receiving the M bits, receiving M bytes through the first interface, wherein each of the M bits indicates a status of a corresponding byte in the M bytes; encapsulating, based on the M bits corresponding to the M bytes, L bytes of the M bytes to obtain L encapsulated bytes, wherein M and L are integers greater than or equal to 1, and L is less than M; exchanging the L encapsulated bytes to a second interface; decapsulating the L encapsulated bytes to obtain L decapsulated bytes; and sending the L decapsulated bytes through the second interface.

16 Claims, 7 Drawing Sheets

(56) References Cited

U.S. PATENT DOCUMENTS

| | | |
|---|---|---|
| 2004/0156390 A1 | 8/2004 | Prasad et al. |
| 2005/0157751 A1* | 7/2005 | Rabie ............... H04L 12/56 370/466 |
| 2007/0097936 A1* | 5/2007 | Lee ............... H04W 74/02 370/338 |
| 2009/0148161 A1 | 6/2009 | Walker et al. |
| 2011/0013690 A1 | 1/2011 | Kobayashi et al. |
| 2015/0055507 A1* | 2/2015 | Korhonen ............ H04L 45/74 370/254 |
| 2015/0229563 A1* | 8/2015 | Luo .................. H04L 69/08 370/392 |
| 2016/0234039 A1* | 8/2016 | Ng .................... H04L 41/0896 |
| 2017/0005742 A1 | 1/2017 | Gareau et al. |
| 2018/0376535 A1* | 12/2018 | Yasuda ............ H04L 12/4633 |

FOREIGN PATENT DOCUMENTS

| | | |
|---|---|---|
| CN | 101803290 A | 8/2010 |
| CN | 102364472 A | 2/2012 |
| CN | 106803814 A | 6/2017 |
| CN | 106850465 A | 6/2017 |
| EP | 1872497 A2 | 1/2008 |
| WO | 2004073222 A1 | 8/2004 |
| WO | 2006113021 A2 | 10/2006 |
| WO | 2009005154 A1 | 1/2009 |
| WO | 2017121158 A1 | 7/2017 |

OTHER PUBLICATIONS

Office Action in Chinese Application No. 201710749377.0, dated Mar. 1, 2021, 11 pages.

Flex Ethernet, Implementation Agreement, IA# OIF-FLEXE-01.0, Mar. 2016. 31 pages.

IEEE Std 802.3-2015, IEEE Standard for Ethernet, IEEE Computer Society, Sponsored by the LAN/MAN Standards Committee, Approved Sep. 3, 2015, 4017 pages.

PCT International Search Report and Written Opinion in International Application No. PCT/CN2018/100,322, dated Nov. 11, 2018, 16 pages (With English Translation).

Office Action issued in Japanese Application No. 2020-512019 dated Mar. 9, 2021, 6 pages (wiuth English translation).

Cheng et al., "Next Generation Package-on-Package Solution to Support Wide IO and High Bandwidth Interface," 2014 IEEE 64th Electronic Components and Technology Conference (ECTC), May 2014, 7 pages.

Office Action issued in Chinese Application No. 201710749377.0 dated Jan. 6, 2022, 4 pages.

Wei, "Design and Implementation of Ethernet High-Speed Interface Based On FPGA," University of Electronic Science and Technology of China, Master Thesis, Jun. 16, 2016, 99 pages (with English abstract).

* cited by examiner

| Preamble | Start-of-frame delimiter | Destination MAC address | Source MAC address | Length | Type | Data and padding | Frame check sequence |

FIG. 5

| Eight octets with T/RX C signals | | | | | | | | 0x00 bits | D1 | D2 | D3 | D4 | D5 | D6 | D7 | 2.5/5 10GE | 40GE 100GE | CPRI |
|---|---|---|---|---|---|---|---|---|---|---|---|---|---|---|---|---|---|---|
| D0 | D1 | D2 | D3 | D4 | D5 | D6 | D7 | 0x01 | D0 | | | | | | | Valid | Valid | Valid |
| C0 | C1 | C2 | C3 | C4 | C5 | C6 | C7 | 0x1E | C0 | C1 | C2 | C3 | C4 | C5 | C6 | C7 | Valid | Valid | Invalid |
| C0 | C1 | C2 | C3 | O4 | D5 | D6 | D7 | 0x2D | C0 | C1 | C2 | C3 | O4 | D5 | D6 | D7 | Valid | Invalid | Invalid |
| C0 | C1 | C2 | C3 | S4 | D5 | D6 | D7 | 0x33 | C0 | C1 | C2 | C3 | | D5 | D6 | D7 | Valid | Invalid | Invalid |
| D0 | D1 | D2 | D3 | S4 | D5 | D6 | D7 | 0x66 | D0 | D1 | D2 | D3 | | D5 | D6 | D7 | Valid | Invalid | Invalid |
| S0 | D1 | D2 | D3 | O4 | D5 | D6 | D7 | 0x55 | | D1 | D2 | D3 | O4 | D5 | D6 | D7 | Valid | Invalid | Invalid |
| D0 | D1 | D2 | D3 | D4 | D5 | D6 | D7 | 0x4B | D0 | D1 | D2 | D3 | D4 | D5 | D6 | D7 | Valid | Valid | Valid |
| C0 | C1 | C2 | C3 | C4 | C5 | C6 | C7 | 0x87 | | | C2 | C3 | C4 | C5 | C6 | C7 | Valid | Valid | Invalid |
| T0 | C1 | C2 | C3 | C4 | C5 | C6 | C7 | 0x99 | | C1 | C2 | C3 | C4 | C5 | C6 | C7 | Valid | Valid | Invalid |
| D0 | T1 | C2 | C3 | C4 | C5 | C6 | C7 | 0xAA | D0 | | | C3 | C4 | C5 | C6 | C7 | Valid | Valid | Invalid |
| D0 | D1 | T2 | C3 | C4 | C5 | C6 | C7 | 0xB4 | D0 | D1 | | | C4 | C5 | C6 | C7 | Valid | Valid | Invalid |
| D0 | D1 | D2 | T3 | C4 | C5 | C6 | C7 | 0xCC | D0 | D1 | D2 | | | C5 | C6 | C7 | Valid | Valid | Invalid |
| D0 | D1 | D2 | D3 | T4 | C5 | C6 | C7 | 0xD2 | D0 | D1 | D2 | D3 | | | C6 | C7 | Valid | Valid | Invalid |
| D0 | D1 | D2 | D3 | D4 | T5 | C6 | C7 | 0xE1 | D0 | D1 | D2 | D3 | D4 | | | C7 | Valid | Valid | Invalid |
| D0 | D1 | D2 | D3 | D4 | D5 | T6 | C7 | 0xFF | D0 | D1 | D2 | D3 | D4 | D5 | | | Valid | Valid | Invalid |
| D0 | D1 | D2 | D3 | D4 | D5 | D6 | T7 | Reserved | D0 | D1 | D2 | D3 | D4 | D5 | D6 | | Valid | Valid | Valid |

ENCAPSULATING AND EXCHANGING BYTES IN A TELECOMMUNICATION SYSTEM

CROSS-REFERENCE TO RELATED APPLICATIONS

This application is a continuation of International Application No. PCT/CN2018/100322, filed on Aug. 14, 2018, which claims priority to Chinese Patent Application No. 201710749377.0, filed on Aug. 28, 2017. The disclosures of the aforementioned applications are hereby incorporated by reference in their entireties.

TECHNICAL FIELD

This application relates to the field of communications technologies, and in particular, to an exchange method and apparatus.

BACKGROUND

An Ethernet defined based on the 802.3 standa\rds of the Institute of Electrical and Electronics Engineers (IEEE) is applied to various scenarios as a service interface, and proves a great success. However, with development of technologies, bandwidth granularity differences widen, it is more likely that there is quite a big gap between an existing bandwidth granularity and an expected bandwidth granularity in actual application. Mainstream required application bandwidth may not belong to any type of Ethernet standard rate. For example, if a 50 Gbps service is transmitted by using 100GE, resources are wasted as a result. However, currently, no corresponding Ethernet standard granularity is available for transmitting a 200 Gbps service. Flexible-bandwidth ports (virtual connections) are expected to share one or more Ethernet physical interfaces, for example, two 40GE ports and two 10GE ports share one 100G physical interface. As a result, a concept of a flexible Ethernet (FlexE) emerges. Specifically, several Ethernet physical layer (PHY) apparatuses are bonded as a FlexE group and functions such as physical layer channelization (sub-rate) are provided, to meet an application requirement for a flexible bandwidth port. A Media Access Control (MAC) rate provided by the FlexE may be greater than that of a single PHY (implemented through bonding), or may be less than that of a single PHY (implemented through channelization).

In the prior art, exchange between FlexE groups is based on a PCS-layer 64B/66B bit block. In this exchange, a byte of a single bit block cannot be identified to implement selective exchange. When effective bandwidth of a receive signal is relatively low, effective bandwidth of a transmit signal obtained after exchange is also relatively low, thereby causing a waste of link bandwidth.

SUMMARY

Embodiments of the present invention provide an exchange method and apparatus, to avoid a waste of link bandwidth.

According to a first aspect, an exchange method is provided, including: receiving M bytes through a first interface; encapsulating L bytes of the M bytes to obtain L encapsulated bytes, where M and L are integers greater than or equal to 1, and L is less than M; exchanging the L encapsulated bytes to a second interface, decapsulating the L encapsulated bytes to obtain L decapsulated bytes; and sending the L decapsulated bytes through the second interface.

The M bytes are identified by using the first interface. The identified M bytes are selectively encapsulated and exchanged, and an unwanted byte may be discarded and not included in encapsulation and exchange. This can improve link bandwidth utilization and reduce exchange load of an exchange unit. Usually, bytes may be classified into data bytes and control bytes. A data byte is usually not allowed to be discarded. Unwanted or idle control bytes may be all ignored and not included in encapsulation and exchange. A wanted control byte and one or more data bytes following the control byte are included in encapsulation and exchange. A control byte that cannot be identified and one or more data bytes following the control byte may be ignored as required, or may be included in encapsulation and exchange as required. If the control byte that cannot be identified and the one or more data bytes following the control byte are exchanged, a downstream node may attempt to identify these bytes.

In a possible design, before the encapsulating L bytes of the M bytes to obtain L encapsulated bytes, the method further includes: receiving, through the first interface, M bits corresponding to the M bytes, where each of the M bits is used to indicate a status of a corresponding byte; and the encapsulating L bytes of the M bytes to obtain L encapsulated bytes includes: encapsulating the L bytes of the M bytes based on the M bits corresponding to the M bytes, to obtain the L encapsulated bytes.

The M bits corresponding to the M bytes are received through the first interface, and each of the M bits is used to indicate the status of the corresponding byte. The M bytes may be effectively identified by using the M bits, to identify an unwanted byte for discarding and a wanted byte for encapsulation and exchange.

In a possible design, the first interface is a first media independent interface, the first media independent interface includes one receive control signal and S receive data signals, and S is an integer greater than 1; the receiving M bytes through a first interface includes: receiving the M bytes by using the S receive data signals; and the receiving, through the first interface, M bits corresponding to the M bytes includes: receiving, by using the one receive control signal, the M bits corresponding to the M bytes.

In a possible design, the receiving the M bytes by using the S receive data signals includes: receiving T groups of bytes by using the S receive data signals, where T is an integer greater than or equal to 1, each group of bytes includes S bytes, a product of S and T is M, and the T groups of bytes include a first group of bytes; and the receiving, by using the one receive control signal, the M bits corresponding to the M bytes includes: receiving T groups of bits by using the one receive control signal, where each group of bits includes S bits, each of the T groups of bits corresponds to one of the T groups of bytes, the T groups of bits include a first group of bits, and the first group of bits corresponds to the first group of bytes.

The M bytes are grouped, the M bits corresponding to the M bytes are also grouped, each group of bits includes S bits, and a corresponding group of bytes is identified by using the S bits. This can effectively reduce system complexity and costs.

In a possible design, the encapsulating L bytes of the M bytes to obtain L encapsulated bytes includes: determining, based on the first group of bits corresponding to the first group of bytes, that a byte in the first group of bytes is a first type byte or a second type byte; encapsulating L1 first type bytes of the M bytes to obtain L1 encapsulated first type bytes, where L1 is an integer greater than or equal to 1, and L1 is less than M; and encapsulating L2 second type bytes of the M bytes to obtain L2 encapsulated second type bytes, where L2 is an integer greater than or equal to 1, and L2 is less than M.

The bytes are classified into two types, and different encapsulation and exchange policies can be implemented for the two types of bytes.

In a possible design, the determining, based on the first group of bits corresponding to the first group of bytes, that a byte in the first group of bytes is a first type byte or a second type byte includes: if all bits in the first group of bits are low-order bits, determining that the byte in the first group of bytes is the first type byte, and if the first group of bits includes a high-order bit, determining that the byte in the first group of bytes is the second type byte; or if all bits in the first group of bits are low-order bits, determining that the byte in the first group of bytes is the first type byte, if the first group of bits includes a high-order bit and if the first group of bytes includes S bytes or T bytes, determining that the byte in the first group of bytes is the first type byte, and if the first group of bits includes a high-order bit and if the first group of bytes does not include the S bytes or the T bytes, determining that the byte in the first group of bytes is the second type byte; or if all bits in the first group of bits are low-order bits, determining that the byte in the first group of bytes is the first type byte, if the first group of bits includes a high-order bit and if the first group of bytes includes T bytes, determining that the byte in the first group of bytes is the first type byte, and if the first group of bits includes a high-order bit and if the first group of bytes does not include the T bytes, determining that the byte in the first group of bytes is the second type byte.

In a possible design, the L1 encapsulated first type bytes include at least one of frame header information, frame end information, intra-frame information, and sequence number information, and the L2 encapsulated second type bytes include at least one of sequence number information.

In a possible design, the exchanging the L encapsulated bytes to a second interface includes: exchanging the L encapsulated first type bytes to the second interface by using a first logical exchange plane; and exchanging the L2 encapsulated second type bytes to the second interface by using a second logical exchange plane.

In a possible design, the decapsulating the L encapsulated bytes to obtain L decapsulated bytes includes: decapsulating the L1 encapsulated first type bytes to obtain L1 decapsulated first type bytes and encapsulation information of the L1 first type bytes, and decapsulating the L2 encapsulated second type bytes to obtain L2 decapsulated second type bytes and encapsulation information of the L2 second type bytes and the sending the L decapsulated bytes through the second interface includes: sending the L1 decapsulated first type bytes and the L2 decapsulated second type bytes based on the encapsulation information of the L1 first type bytes and the encapsulation information of the L2 second type bytes through the second interface.

According to a second aspect, an exchange apparatus is provided, including: a first interface circuit, configured to receive M bytes through a first interface, and encapsulate L bytes of the M bytes to obtain L encapsulated bytes, where M and L are integers greater than or equal to 1, and L is less than M; an exchange circuit, configured to exchange the L encapsulated bytes to a second interface circuit; and the second interface circuit, configured to decapsulate the L encapsulated bytes to obtain L decapsulated bytes, and send the L decapsulated bytes through a second interface.

In a possible design, the first interface circuit is specifically configured to receive the M bytes through the first interface, and receive, through the first interface, M bits corresponding to the M bytes, where each of the M bits is used to indicate a status of a corresponding byte; and encapsulate the L bytes of the M bytes based on the M bits corresponding to the M bytes, to obtain the L encapsulated bytes.

In a possible design, the first interface is a first media independent interface, the first media independent interface includes one receive control signal and S receive data signals, and S is an integer greater than 1; that a first interface circuit is configured to receive M bytes through a first interface includes: the first interface circuit is configured to receive the M bytes by using the S receive data signals; and that the first interface circuit is configured to receive, through the first interface, M bits corresponding to the M bytes includes: the first interface circuit is configured to receive, by using the one receive control signal, the M bits corresponding to the M bytes.

In a possible design, that the first interface circuit is configured to receive the M bytes by using the S receive data signals includes: the first interface circuit is configured to receive T groups of bytes by using the S receive data signals, where T is an integer greater than or equal to 1, each group of bytes includes S bytes, a product of S and T is M, and the T groups of bytes include a first group of bytes; and that the first interface circuit is configured to receive, by using the one receive control signal, the M bits corresponding to the M bytes includes: the first interface circuit is configured to receive T groups of bits by using the one receive control signal, where each group of bits includes S bits, each of the T groups of bits corresponds to one of the T groups of bytes, the T groups of bits include a first group of bits, and the first group of bits corresponds to the first group of bytes.

In a possible design, that a first interface circuit is configured to encapsulate L bytes of the M bytes to obtain L encapsulated bytes includes: the first interface circuit is configured to determine, based on the first group of bits corresponding to the first group of bytes, that a byte in the first group of bytes is a first type byte or a second type byte; encapsulate L1 first type bytes of the M bytes to obtain L1 encapsulated first type bytes, where L1 is an integer greater than or equal to 1, and L1 is less than M; and encapsulate L2 second type bytes of the M bytes to obtain L2 encapsulated second type bytes, where L2 is an integer greater than or equal to 1, and L2 is less than M.

In a possible design, that the first interface circuit is configured to determine, based on the first group of bits corresponding to the first group of bytes, that a byte in the first group of bytes is a first type byte or a second type byte includes: the first interface circuit is configured to: if all bits in the first group of bits are low-order bits, determine that the byte in the first group of bytes is the first type byte, and if the first group of bits includes a high-order bit, determine that the byte in the first group of bytes is the second type byte; or the first interface circuit is configured to: if all bits in the first group of bits are low-order bits, determine that the byte in the first group of bytes is the first type byte, if the first group of bits includes a high-order bit and if the first group of bytes includes S bytes or T bytes, determine that the byte in the first group of bytes is the first type byte, and if the first group of bits includes a high-order bit and if the first group of bytes does not include the S bytes or the T bytes, determine that the byte in the first group of bytes is the second type byte; or the first interface circuit is configured to: if all bits in the first group of bits are low-order bits, determine that the byte in the first group of bytes is the first type byte, if the first group of bits includes a high-order bit and if the first group of bytes includes T bytes, determine that the byte in the first group of bytes is the first type byte, and if the first group of bits includes a high-order bit and if the first group of bytes does not include the T bytes, determine that the byte in the first group of bytes is the second type byte.

In a possible design, the L1 encapsulated first type bytes include at least one of frame header information, frame end information, intra-frame information, and sequence number information, and the L2 encapsulated second type bytes include at least one of sequence number information.

In a possible design, that an exchange circuit is configured to exchange the L encapsulated bytes to a second interface includes: the exchange circuit is configured to exchange the L1 encapsulated first type bytes to the second interface by using a first logical exchange plane; and exchange the L2 encapsulated second type bytes to the second interface by using a second logical exchange plane.

In a possible design, that the second interface circuit is configured to decapsulate the L encapsulated bytes to obtain L decapsulated bytes includes: the second interface circuit is configured to decapsulate the L1 encapsulated first type bytes to obtain L1 decapsulated first type bytes and encapsulation information of the L1 first type bytes, and decapsulate the L2 encapsulated second type bytes to obtain L2 decapsulated second type bytes and encapsulation information of the L2 second type bytes; and that the second interface circuit is configured to send the L decapsulated bytes through a second interface includes: the second interface circuit is configured to send the L1 decapsulated first type bytes and the L2 decapsulated second type bytes based on the encapsulation information of the L1 first type bytes and the encapsulation information of the L2 second type bytes through the second interface.

BRIEF DESCRIPTION OF DRAWINGS

FIG. 5 is a schematic diagram of a code pattern definition for PCS layer coding according to an embodiment of the present invention;

DESCRIPTION OF EMBODIMENTS

To make the objectives, technical solutions, and advantages of the present invention clearer and more comprehensible, the following further describes the present invention in detail with reference to the accompanying drawings and embodiments.

The technical solutions provided in the embodiments of the present invention may be applied to a flexible Ethernet, or may be applied to another type of network, for example, an Ethernet, an optical transport network (OTN), or a synchronous digital hierarchy (SDH) network. The embodiments of the present invention are mainly described by using the flexible Ethernet as an example.

Figure 1:
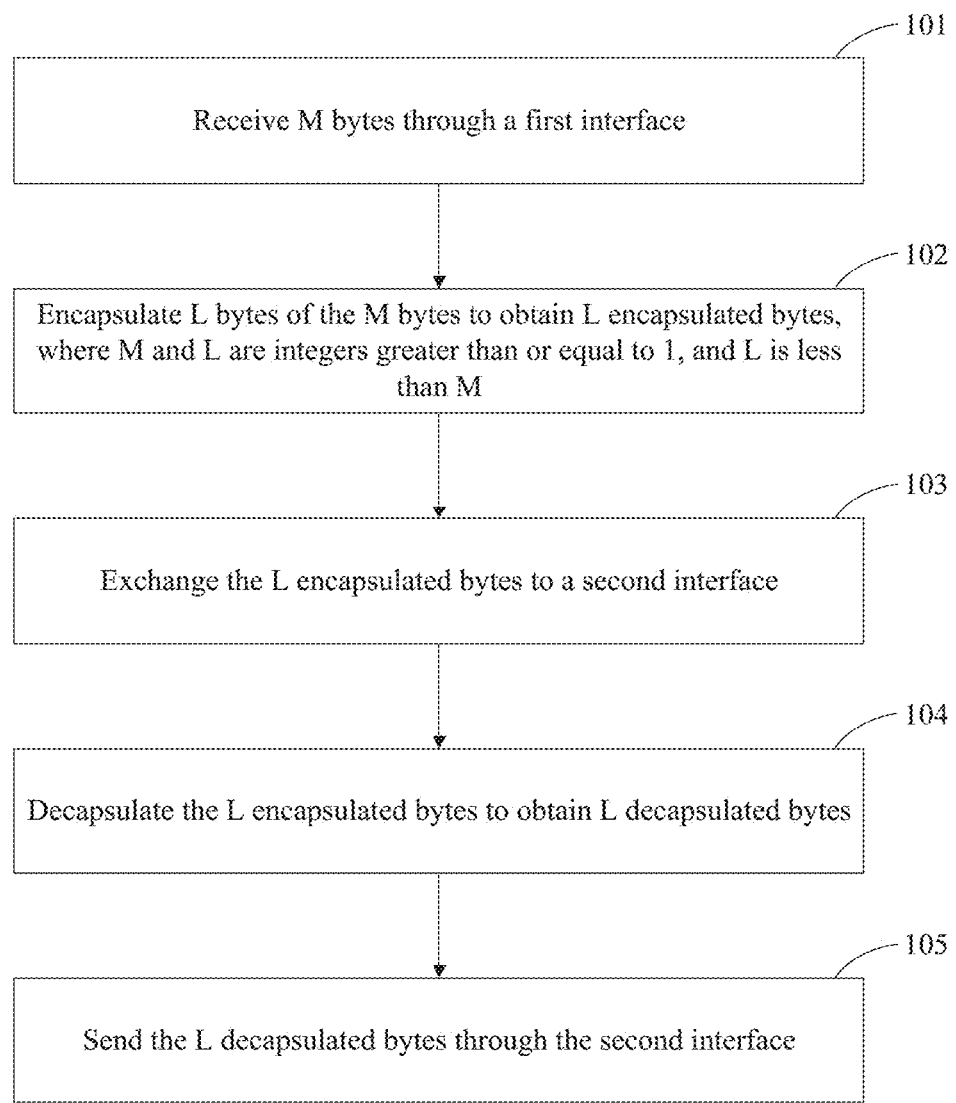
FIG. 1 is a schematic flowchart of an exchange method according to an embodiment of the present invention.

FIG. 1 is a schematic flowchart of an exchange method according to an embodiment of the present invention. The method includes the following steps.

S101. Receive M bytes through a first interface.

S102. Encapsulate L bytes of the M bytes to obtain L encapsulated bytes, where M and L are integers greater than or equal to 1, and L is less than M.

S103. Exchange the L encapsulated bytes to a second interface.

S104. Decapsulate the L encapsulated bytes to obtain L decapsulated bytes.

S105. Send the L decapsulated bytes through the second interface.

In this embodiment of the present invention, the M bytes are identified by using the first interface. The identified M bytes are selectively encapsulated and exchanged, and an unwanted byte may be discarded and not included in encapsulation and exchange. This can improve link bandwidth utilization and reduce exchange load of an exchange unit. Usually, bytes may be classified into data bytes and control bytes. A data byte is usually not allowed to be discarded. Unwanted or idle control bytes may be all ignored and not included in encapsulation and exchange. A wanted control byte and one or more data bytes following the control byte are included in encapsulation and exchange. A control byte that cannot be identified and one or more data bytes following the control byte may be ignored as required, or may be included in encapsulation and exchange as required. If the control byte that cannot be identified and the one or more data bytes following the control byte are exchanged, a downstream node may attempt to identify these bytes.

In a possible design, M bits corresponding to the M bytes may be received through the first interface. Each of the M bits is used to indicate a status of a corresponding byte. The L bytes of the M bytes are encapsulated based on the M bits corresponding to the M bytes, to obtain the L encapsulated bytes. In other words, based on the M bits corresponding to the M bytes, an idle byte or another unwanted byte may be selected for discarding, or L wanted bytes are directly selected for encapsulation and exchange. Byte selection may also be performed in another manner, for example, through designation by a network administrator. This is not limited in this embodiment of the present invention.

Figures 2, 3:
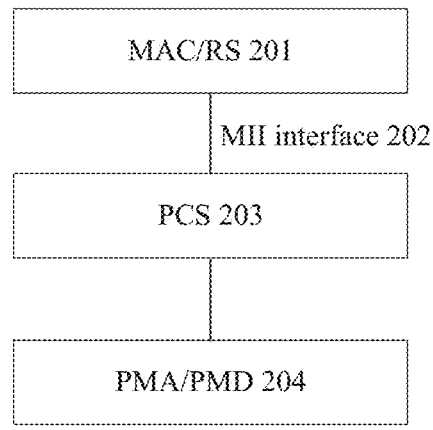
FIG. 2 is a schematic diagram of an MII interface hierarchy according to an embodiment of the present invention.
FIG. 3 is a schematic diagram of a frame format of an Ethernet frame according to an embodiment of the present invention.

For a flexible Ethernet, a media independent interface (MII) interface may be selected for byte reception and identification. The MII interface is an interface between a Media Access Control (MAC) layer/reconciliation sublayer (RS) and a physical coding sublayer (PCS). FIG. 2 is a schematic diagram of an MII interface hierarchy according to an embodiment of the present invention. The MII interface hierarchy includes a MAC/RS layer 201, a PCS layer 203, and a physical medium attachment (PMA) sublayer/ physical medium dependent (PMD) sublayer 204, and an MII interface 202 is between the MAC/RS layer 201 and the PCS layer 203. A signal transmit direction is a top-to-bottom direction, and a signal receive direction is a bottom-to-top direction. There are many types of MII interfaces. Common MII interfaces include an MII, a reduced media independent interface (RMII), a 1 Gbps media independent interface (GMII), a 10 Gbps media independent interface (XGMII), a 40 Gbps media independent interface (XLGMII), a 100 Gbps media independent interface (CGMII), and the like. The receive direction is used as an example. One MII interface includes one receive control signal and S receive data signals, and S is an integer greater than 1. For example, one CGMII interface includes one receive control signal and eight receive data signals. Therefore, the M bytes may be received by using the S receive data signals of the MII interface, and the M bits corresponding to the M bytes are received by using the one receive control signal of the MII interface.

FIG. 3 is a schematic diagram of a frame format of an Ethernet frame according to an embodiment of the present invention. The Ethernet frame includes a seven-byte preamble, a one-byte start-of-frame delimiter, a six-byte destination MAC address, a six-byte source MAC address, a two-byte length, a two-byte type, data and padding of 46 bytes to 1500 bytes, and a four-byte frame check sequence. The preamble is mainly used for synchronization, and the start-of-frame delimiter is mainly used to indicate that a next byte is a destination MAC field. There is an interpacket gap (IPG) between Ethernet frames. The frame format of the Ethernet frame shown in FIG. 3 may be an example frame format for the MAC/RS layer 201 in FIG. 2.

Figure 4A:
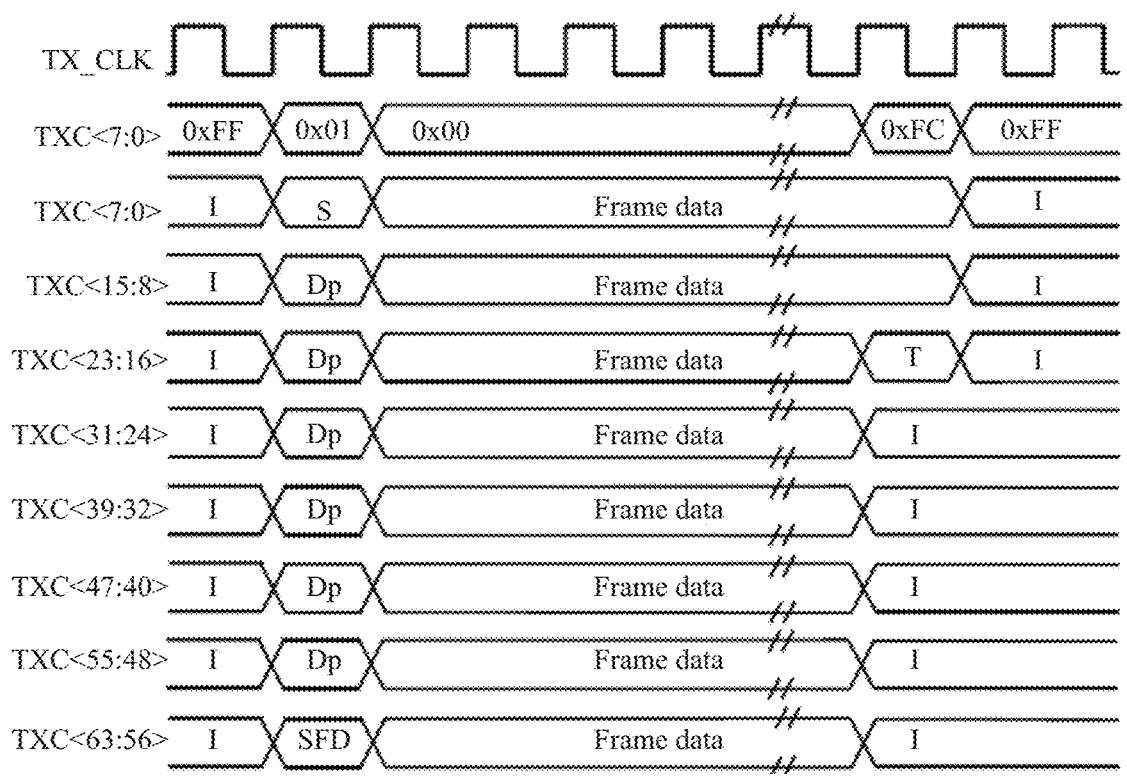
FIG. 4A is a schematic diagram of a transmit signal for a CGMII interface according to an embodiment of the present invention.

FIG. 4A is a schematic diagram of a transmit signal for a CGMII interface according to an embodiment of the present invention. The CGMII interface is configured to send a signal from a MAC/RS layer to a PCS layer. An example in which a signal is sent from the MAC/RS layer to the PCS layer is used for description. From top to bottom, there is one transmit clock (TX_CLK) signal, one transmit control (TXC) signal, and eight transmit data (TXD) signals in sequence. In one clock cycle, one TXC signal includes eight bits, for example, 0xFF or 0x01, each TXD signal includes one byte, eight TXD signals include eight bytes in total, and each byte corresponds to one bit of the TXC signal. When a corresponding byte is a control byte, a corresponding bit is set as a high-order bit, and when the corresponding byte is a data byte, the corresponding bit is set as a low-order bit. In a first cycle, all bytes are control bytes (idle bytes I), and eight bits corresponding to eight bytes are all set as high-order bits: 0xFF. In a second cycle, a first TXD signal is a control byte (a start byte S), and a corresponding bit is set as a high-order bit. A second TXD signal to an eighth TXD signal are data bytes, corresponding bits are set as low-order bits, Dp is a preamble data byte, a start-of-frame delimiter (SFD) is a start-of-frame delimiter byte, and eight bits corresponding to eight bytes are 0x01. In third to seventh cycles, all bytes are data bytes, and are used to transmit information such as the destination MAC address, the source MAC address, the length, the type, the data and padding, and the frame check sequence in the frame structure shown in FIG. 3, and eight bits corresponding to eight bytes are all 0x00. In an eighth cycle, first two TXD signals are data bytes, a third TXD signal to an eighth TXD signal are control bytes, T is an end byte, I is an idle byte, and eight bits corresponding to eight bytes are 0xFC.

Figure 4B:
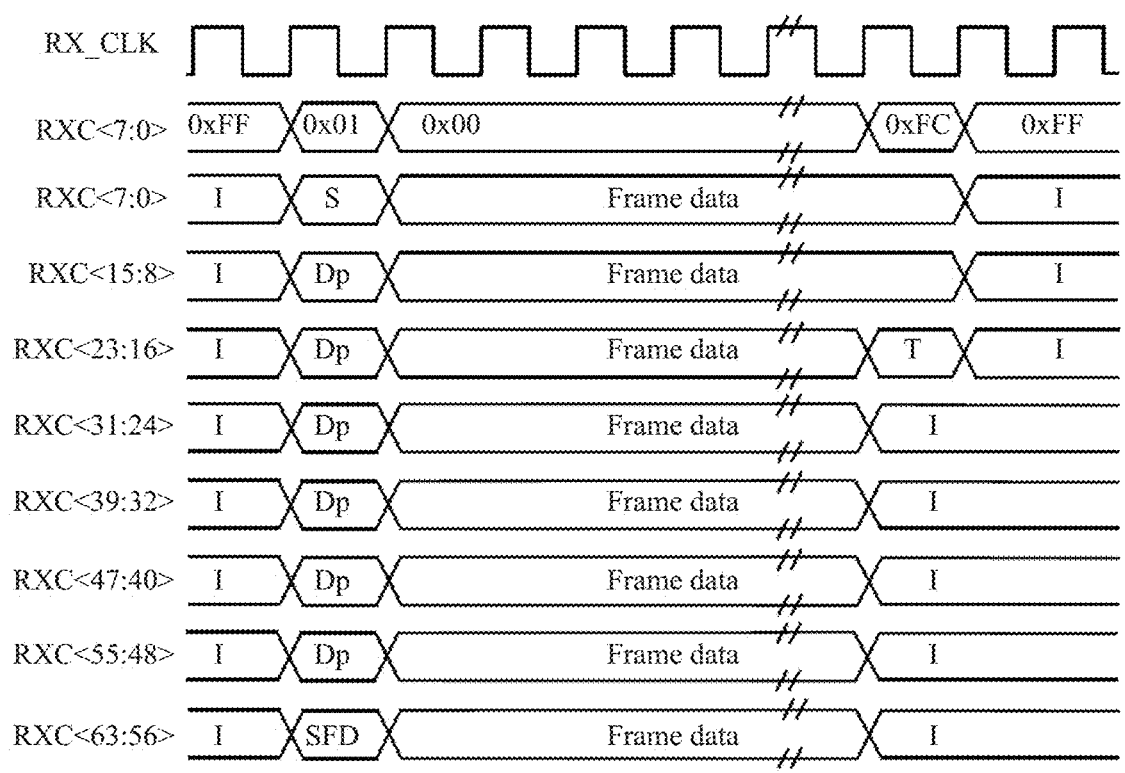
FIG. 4B is a schematic diagram of a receive signal for a CGMII interface according to an embodiment of the present invention.

FIG. 4B is a schematic diagram of a receive signal for a CGMII interface according to an embodiment of the present invention. The CGMII interface is used by a PCS layer to receive a signal from a MAC/RS layer. An example in which a signal is received from the MAC/RS layer by the PCS layer is used for description. From top to bottom, there is one receive clock (RX_CLK) signal, one receive control (RXC) signal, and eight receive data (RXD) signals in sequence. In one clock cycle, one RXC signal includes eight bits, for example, 0xFF or 0x01, each RXD signal includes one byte, eight RXD signals include eight bytes in total, and each byte corresponds to one bit of the RXC signal. When a corresponding byte is a control byte, a corresponding bit is a high-order bit, and when the corresponding byte is a data byte, the corresponding bit is a low-order bit. Descriptions of the RX_CLK signal, the RXC signal, and the RXD signal are similar to those in FIG. 4A. Details are not described herein again.

FIG. 5 is a schematic diagram of a code pattern definition for PCS layer coding according to an embodiment of the present invention. FIG. 5 shows 64B/66B encoding. Two bits "10" or "01" in a header are synchronization header bits of a 64B/66B bit block, and subsequent 64 bits are used to carry payload data or a protocol. Each row represents a bit block code pattern definition, D0 to D7 represent data bytes, C0 to C7 represent control bytes, S0 represents a start byte, and T0 to T7 represent end bytes. A $1^{st}$ row is a data block, and is a data code pattern; synchronization header bits are "01", and subsequent bytes are all data bytes. A $2^{nd}$ row, a $3^{rd}$ row, and a $4^{th}$ row are control blocks, and synchronization bits are "10". The $2^{nd}$ row is mainly used for frequency offset adaptation, and the control blocks in the $3^{rd}$ row and the $4^{th}$ row are no longer supported at 40GE and a higher rate. A $5^{th}$ row, a $6^{th}$ row, and an $8^{th}$ row are ordered set (O) code control blocks, and are a control code pattern; synchronization bits are "10". The control blocks are mainly used for operation and maintenance management. The control code blocks in the $5^{th}$ row and the $6^{th}$ row are no longer supported at 40E and a higher rate. A $7^{th}$ row is a start block, and is a control code pattern; synchronization header bits are "10". A $9^{th}$ row to a $16^{th}$ row are eight types of end blocks, and are a control code pattern; synchronization header bits are "10".

For a method for transmitting control blocks in the $7^{th}$ row and the $9^{th}$ to the $16^{th}$ row through an MII interface, refer to FIG. 4B. This method is similar to a method for transmitting other control blocks, for example, the control blocks in the $8^{th}$ row, through an MII interface. For example, in one cycle, a first RXD signal is an O code control byte, second to fourth RXD signals are three data bytes in total: D1, D2, and D3, $5^{th}$ to $8^{th}$ RXD signals are control bytes (for example, idle bytes), and eight bits corresponding to eight bytes are 0xF1.

Figure 6:
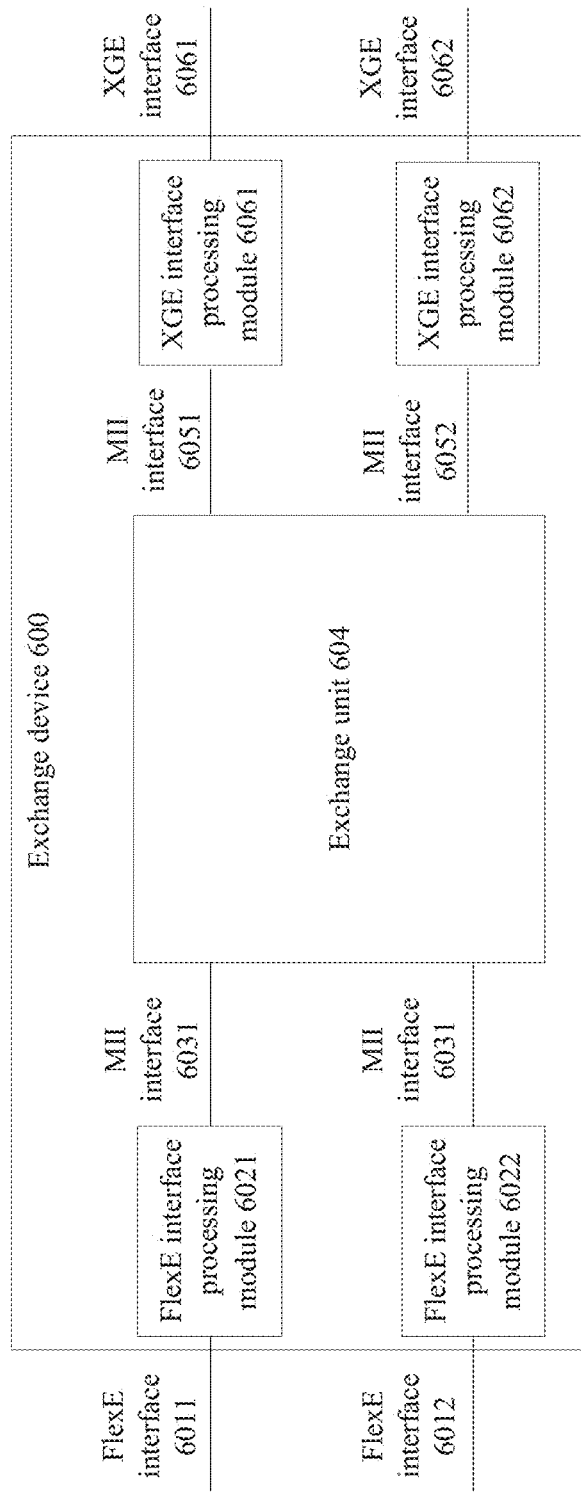
FIG. 6 is a schematic structural diagram of an exchange apparatus according to an embodiment of the present invention.

FIG. 6 is a schematic structural diagram of an exchange apparatus according to an embodiment of the present invention. An exchange device 600 includes two FlexE interfaces: 6011 and 6012, and further includes two XGE interfaces: 6061 and 6062. In FIG. 6, an exchange unit 604 may exchange a received signal to a different interface, and this mainly includes four types of exchange. A first type is FlexE interface-to-FlexE interface exchange; a second type is XGE interface-to-XGE interface exchange; a third type is FlexE interface-to-XGE interface exchange; and a fourth type is XGE interface-to-FlexE interface exchange.

After being processed by a FlexE interface processing module, a signal received from a FlexE interface may be sent to the exchange unit 604 through an MII interface. Processing of the FlexE interface processing module may be processing such as PMA, PMD, or PCS.

In a possible design, a 64B/66B code block stream is obtained in PCS processing, and the 64B/66B code block stream needs to be decoded, and then sent to the MII interface, as shown in FIG. 5 and FIG. 4A. For example, during transmission of a data code block to the MII interface, a synchronization header "01" is removed, and data bytes D0 to D7 are respectively sent to eight channels of TXD signals. In addition, a low level is set for eight bits of a TXC signal to identify a data type. For a control code block, a control character is converted into an MII control character and then transmitted to a corresponding channel, and a high level is set for a corresponding bit of a TXC signal. A data byte in the control code block is transmitted as data to a corresponding MII channel, and a low level is set for a corresponding bit of the TXC signal.

After being processed by an XGE interface processing module, a signal received from an XGE interface may be sent to the exchange unit 604 through an MII interface. Processing of the XGE interface processing module may be processing such as PMA, PMD, or PCS.

The XGE interface may be a 10GE interface, a 40GE interface, or the like, and is a non-FlexE interface. Certainly, the XGE interface may also be a common public radio interface (CPRI) interface. If the XGE interface is a CPRI interface, an 8B/10B code block stream is obtained. The 8B/10B code block stream needs to be transcoded and then sent to the MII interface. An 8B/10B code block is decoded into eight-bit data or control, and every 8 octets is used as one group and successively sent to eight channels of the MII interface. A low level or a high level is set for each of eight bits of a TXC signal based on a data type or a control type.

After being exchanged by the exchange unit 604, a signal may be sent to a FlexE interface processing module through an MII interface for processing, and then sent to another device through a FlexE interface. Processing of the FlexE interface processing module may be processing such as PMA, PMD, or PCS.

In a possible design, for a byte received by the MII interface, the FlexE interface processing module encodes the byte into a 64B/66B code block stream. For example, for data bytes, eight data bytes are put into a bit 2 to a bit 65 of a 64B/66B code block, and bit 0 and bit 1 of a synchronization header are set to "01". For a control byte, control characters are converted into seven-bit control characters in a 64B/66B code block specification, and put into control character positions (identified as C0, C1, C2, C3, C4, C5, C6, or C7) in a 64B/66B code block, a bit 2 to a bit 9 are set to be a control type in the 64B/66B code block specification, and data bytes following the control byte are put into data positions (identified as D0, D1, D2, D3, D4, D5, D6, or D7) in the 64B/66B control block. Then, the control byte and the data byte form a 64B/66B code block stream for continuous transmission.

After being exchanged by the exchange unit 604, a signal may be sent to an XGE interface processing module through an MII interface for processing, and then sent to another device through an XGE interface. Processing of the XGE interface processing module may be processing such as PMA, PMD, or PCS.

Figure 7A:
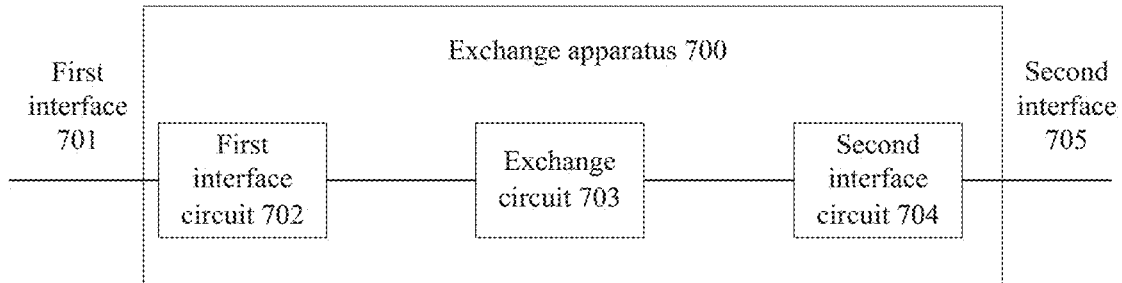
FIG. 7A is a schematic structural diagram of another exchange apparatus according to an embodiment of the present invention.

FIG. 7A is a schematic structural diagram of an exchange apparatus according to an embodiment of the present invention. The exchange apparatus includes a first interface 701 and a second interface 705. A first interface circuit 702 is connected to the first interface 701 and an exchange circuit 703, and a second interface circuit 704 is connected to the second interface 705 and the exchange circuit 703. If both the first interface and the second interface are MII interfaces, the two interfaces may be applied to the exchange unit 604 in FIG. 6.

The first interface circuit 702 is configured to receive M bytes through the first interface, and encapsulate L bytes of the M bytes to obtain L encapsulated bytes, where M and L are integers greater than or equal to 1, and L is less than M.

The exchange circuit 703 is configured to exchange the L encapsulated bytes to the second interface circuit.

The second interface circuit 704 is configured to decapsulate the L encapsulated bytes to obtain L decapsulated bytes, and send the L decapsulated bytes through the second interface.

In this embodiment of the present invention, the M bytes are identified by using the first interface. The identified M bytes are selectively encapsulated and exchanged, and an unwanted byte may be discarded and not included in encapsulation and exchange. This can improve link bandwidth utilization and reduce exchange load of an exchange unit. Usually, bytes may be classified into data bytes and control bytes. A data byte is usually not allowed to be discarded. Unwanted or idle control bytes may be all ignored and not included in encapsulation and exchange. A wanted control byte and one or more data bytes following the control byte are included in encapsulation and exchange. A control byte that cannot be identified and one or more data bytes following the control byte may be ignored as required, or may be included in encapsulation and exchange as required. If the control byte that cannot be identified and the one or more data bytes following the control byte are exchanged, a downstream node may attempt to identify these bytes.

In a possible design, the first interface circuit 702 may be configured to receive the M bytes through the first interface, and receive, through the first interface, M bits corresponding to the M bytes, where each of the M bits is used to indicate a status of a corresponding byte; and encapsulate the L bytes of the M bytes based on the M bits corresponding to the M bytes, to obtain the L encapsulated bytes. In other words, based on the M bits corresponding to the M bytes, an idle byte or another unwanted byte may be selected for discarding, or L wanted bytes are directly selected for encapsulation and exchange. Byte selection may also be performed in another manner, for example, through designation by a network administrator. This is not limited in this embodiment of the present invention.

In a possible design, the first interface may be a first media independent interface, the first media independent interface includes one receive control signal and S receive data signals, and S is an integer greater than 1. The first interface circuit is configured to receive the M bytes by using the S receive data signals; and the first interface circuit is further configured to receive, by using the one receive control signal, the M bits corresponding to the M bytes. For example, if the first interface is a CGMII interface, and the first interface includes one receive control signal and eight receive data signals.

The bytes are received through the first media independent interface, and then the bytes are encapsulated and exchanged. If a peer end of the first interface is a MAC/RS layer, PCS layer processing is performed on the exchanged byte at the second interface, for example, PCS layer processing is performed by using the second interface circuit. If the peer end of the first interface is a PCS Layer, MAC/RS layer processing is not performed in a process of exchange from the first interface to the second interface. After the exchanged byte is sent through the second interface, another apparatus may perform MAC/RS layer processing to restore a MAC frame for upper layer processing.

In a possible design, the first interface circuit is configured to receive T groups of bytes by using the S receive data signals, where T is an integer greater than or equal to 1. Each group of bytes includes S bytes, a product of S and T is M, and the T groups of bytes include a first group of bytes. The first interface circuit is configured to receive T groups of bits by using the one receive control signal. Each group of bits includes S bits, each of the T groups of bits corresponds to one of the T groups of bytes, the T groups of bits include a first group of bits, and the first group of bits corresponds to the first group of bytes. As shown in FIG. 4B, eight bytes of eight RXD signals in one clock cycle may be considered as one group of bytes, and eight bits of a corresponding RXC signal is considered as one group of bits. A quantity of clock cycles indicates a quantity of groups of bytes and a quantity of groups of bits. Certainly, 16 bytes of eight RXD signals in two clock cycles may alternatively be considered as one group of bytes.

Figure 7B:
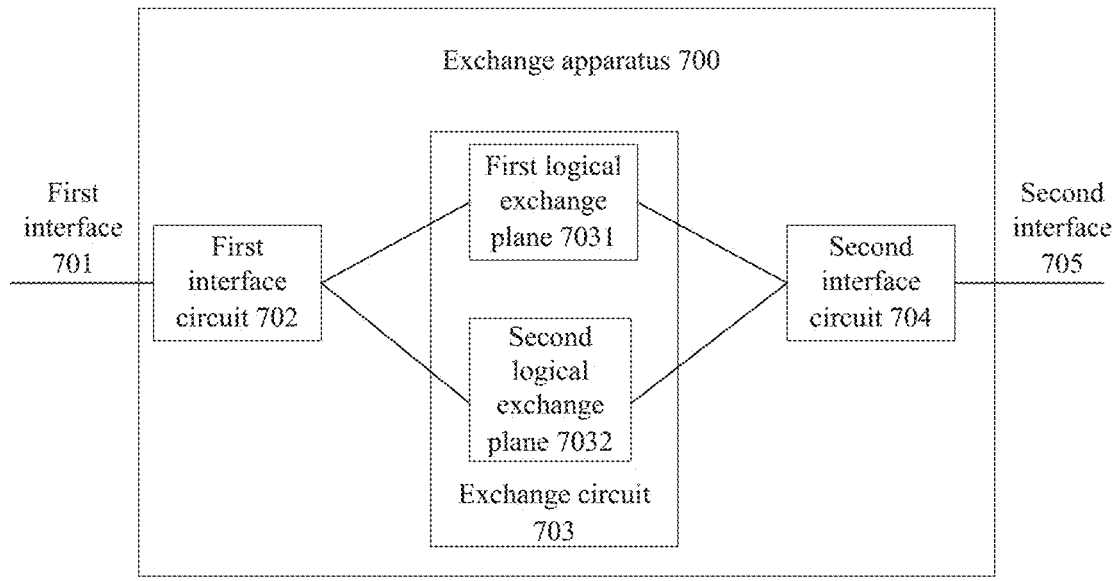
FIG. 7B is a schematic structural diagram of still another exchange apparatus according to an embodiment of the present invention.

FIG. 7B is a schematic structural diagram of an exchange apparatus according to an embodiment of the present invention. The exchange apparatus includes a first interface 701 and a second interface 705. A first interface circuit classifies and separately encapsulates received bytes. After being exchanged to a second interface circuit by using different logical exchange planes, the received bytes are combined, and then are output through the second interface. The different logical exchange planes are a first logical exchange plane 7031 and a second logical exchange plane 7032 in FIG. 7B.

In a possible design, the first interface circuit 702 is configured to determine, based on the first group of bits corresponding to the first group of bytes, that a byte in the first group of bytes is a first type byte or a second type byte; encapsulate L1 first type bytes of the M bytes to obtain L1 encapsulated first type bytes, where L1 is an integer greater than or equal to 1, and L1 is less than M; and encapsulate L2 second type bytes of the M bytes to obtain L2 encapsulated second type bytes, where L2 is an integer greater than or equal to 1, and L2 is less than M.

The first logical exchange plane 7031 and the second logical exchange plane 7032 are functionally independent exchange planes, and may be a same exchange network or different exchange networks physically. Specifically, a physical exchange network may be a circuit switched network, and the interface circuits are directly interconnected by using the circuit switched network. The physical exchange network may also be a FlexE using time division multiplexing (TDM) exchange that is used in a synchronous digital hierarchy (SDH)/optical transport network (OTN). The L1 encapsulated first type bytes and the L2 encapsulated second type bytes are separately loaded, for example, may be loaded into virtual concatenation of the SDH or an optical channel data unit on the OTN, for exchange. The physical exchange network may also be a packet switched network, and the L1 encapsulated first type bytes and the L2 encapsulated second type bytes are separately loaded to an exchange cell on the packet switched network, for exchange. Certainly, other exchange networks may also be used. This is not limited in this embodiment of the present invention. In a possible design, a process of loading a byte to a cell, a virtual concatenation, or the like is an encapsulation process. This is not limited in this embodiment of the present invention.

In this embodiment of the present invention, the received bytes are classified, so that different exchange, management, and control policies may be used for implementation. The following describes several byte classification methods.

Method 1: The first interface circuit is configured to: if all bits in the first group of bits are low-order bits, determine that the byte in the first group of bytes is the first type byte, and if the first group of bits includes a high-order bit, determine that the byte in the first group of bytes is the second type byte. Referring to FIG. 4B, five groups of RXC signals corresponding to third to seventh cycles are all 0x00, that is, all the RXC signals are low-order bits, and bytes corresponding to the RXC signals are classified as first type bytes. RXC signals corresponding to other cycles include a high-order bit, and bytes corresponding to the RXC signals are classified as second type bytes. All data corresponding to the first type byte is wanted data in a frame structure and cannot be deleted, and needs to be encapsulated. An encapsulation size may be determined based on an exchange granularity of the exchange circuit. The second type byte includes a control byte, and may be selectively discarded. For example, eight bytes in a first cycle are all idle bytes and can be deleted. Eight bytes in a second cycle may or may not be included in encapsulation of the second type byte, because the eight bytes are usually in an agreed format and can be restored at the second interface. For eight bytes in an eighth cycle, last five bytes are idle bytes and may be deleted; a $3^{rd}$ byte is an end byte, and may be deleted and then restored at the second interface, or may be included in encapsulation of the second type byte to reduce design complexity; and first two bytes are data bytes and need to be included in encapsulation of the second type byte.

Method 2: The first interface circuit is configured to: if all bits in the first group of bits are low-order bits, determine that the byte in the first group of bytes is the first type byte, if the first group of bits includes a high-order bit and if the first group of bytes includes S bytes or T bytes, determine that the byte in the first group of bytes is the first type byte, and if the first group of bits includes a high-order bit and if the first group of bytes does not include the S bytes or the T bytes, determine that the byte in the first group of bytes is the second type byte. Referring to FIG. 4B, five groups of RXC signals corresponding to third to seventh cycles are all 0x00, that is, all the RXC signals are low-order bits, and bytes corresponding to the RXC signals are classified as first type bytes. Bits corresponding to a second cycle are 0x01 and include a high-order bit, corresponding bytes include S bytes, and eight bytes are classified as first type bytes. Bits corresponding to an eighth cycle are 0xFC and include a high-order bit, corresponding bytes include T bytes, and eight bytes are classified as first type bytes. Bits corresponding to a first cycle are 0xFF and include a high-order bit, corresponding bytes do not include S bytes or T bytes, and eight bytes are classified as second type bytes. All the first type bytes may or may not be included in encapsulation and exchange of the first type bytes, except that five groups of bytes corresponding to the third to the seventh cycles and first two bytes in the eighth cycle cannot be discarded. The second type bytes may also be selectively encapsulated and exchanged.

Method 3: The first interface circuit is configured to: if all bits in the first group of bits are low-order bits, determine that the byte in the first group of bytes is the first type byte, if the first group of bits includes a high-order bit and if the first group of bytes includes T bytes, determine that the byte in the first group of bytes is the first type byte, and if the first group of bits includes a high-order bit and if the first group of bytes does not include the T bytes, determine that the byte in the first group of bytes is the second type byte. Referring to FIG. 4B, five groups of RXC signals corresponding to third to seventh cycles are all 0x00, that is, all the RXC signals are low-order bits, and bytes corresponding to the RXC signals are classified as first type bytes. Bits corresponding to an eighth cycle are 0xFC and include a high-order bit, corresponding bytes include T bytes, and eight bytes are classified as first type bytes. Bits corresponding to a first cycle are 0xFF and include a high-order bit, corresponding bytes do not include T bytes, and eight bytes are classified as second type bytes. Bits corresponding to a second cycle are 0x01 and include a high-order bit, corresponding bytes do not include T bytes, and eight bytes are classified as second type bytes. All the first type bytes may or may not be included in encapsulation and exchange of the first type bytes, except that five groups of bytes corresponding to the third to the seventh cycles and first two bytes in the eighth cycle cannot be discarded. The second type bytes may also be selectively encapsulated and exchanged.

For an O code control block received through the MII interface, for example, a first RXD signal is an O code control byte, second to fourth RXD signals are three data bytes: D1, D2, and D3, fifth to eighth RXD signals are control bytes (for example, idle bytes), eight bits corresponding to the eight bytes are 0xF1, and all the eight bytes are classified as second type bytes based on the foregoing classification method. If the O code control byte is a wanted control byte, the O code control byte and three data bytes following the O code control byte need to be included in encapsulation and exchange. If the O code control byte is a control byte that cannot be identified, the O code control byte may not be included in encapsulation and exchange.

In a possible design, a control byte defined in a standard specification, for example, local fault (LF) information and remote fault (RF) information used to negotiate a link status, is included in encapsulation and exchange. A control byte that cannot be identified may be configured based on a policy. For example, if an error occurs on a bit of an idle 64B/66B block during transmission, that is, the bit is inversed, when being sent through an MII interface, a byte to which the inversed bit belongs may be identified as a data byte for transmission, and eight bytes of eight RXD signals are also encapsulated and exchanged.

In a possible design, the L1 encapsulated first type bytes include at least one of frame header information, frame end information, intra-frame information, and sequence number information, and the L2 encapsulated second type bytes include at least one of sequence number information. If the first classification method is used, the first type byte and the second type byte are exchanged by using different logical exchange planes. The different logical exchange planes may have different delays, and the sequence number information is required for sorting the second type bytes in the second cycle, the first type bytes in the third to the seven cycles, and the second type bytes in the eighth cycle, to perform combination processing at the second interface circuit.

In a possible design, the exchange circuit is configured to exchange the L1 encapsulated first type bytes to the second interface by using a first logical exchange plane; and exchange the L2 encapsulated second type bytes to the second interface by using a second logical exchange plane.

In a possible design, the second interface circuit is configured to decapsulate the L1 encapsulated first type bytes to obtain L1 decapsulated first type bytes and encapsulation information of the L1 first type bytes, and decapsulate the L2 encapsulated second type bytes to obtain L2 decapsulated second type bytes and encapsulation information of the L2 second type bytes; and the second interface circuit is further configured to send the L1 decapsulated first type bytes and the L2 decapsulated second type bytes based on the encapsulation information of the L1 first type bytes and the encapsulation information of the L2 second type bytes through the second interface.

In this embodiment of the present invention, exchange may be performed based on an already standardized MII interface, to use a PHY layer and a MAC layer in an existing Ethernet industry chain, thereby reducing cost pressure brought by a new exchange technology. Exchange is performed based on an MII signal obtained by decoding a 64B/66B code block, so that a type of each byte may be identified to implement refined exchange, management, and control policies. For example, bytes may be classified into two types, as shown in the embodiment in FIG. 7, to separately execute different exchange, management, and control policies. In addition to a 64B/66B code block, exchange performed based on a byte or decoupling from an encoding and decoding manner at a physical layer may be applied to a larger code block such as a 256b/257b code block or a smaller code block such as an 8B/10B code block.

In an implementation process, steps in the foregoing methods may be implemented by using a hardware integrated logic circuit in a processor, or by using instructions in a form of software. The steps of the method disclosed with reference to the embodiments of the present invention may be directly performed by a hardware processor, or may be performed by using a combination of hardware in the processor and a software unit. The software unit may be located in a mature storage medium in the art, for example, a random access memory, a flash memory, a read-only memory, a programmable read-only memory, an electrically erasable programmable memory, or a register. The storage medium is located in the memory, and a processor reads information in a memory. The processor reads information in the memory, and performs the steps in the foregoing methods together with the hardware of the processor. To avoid repetition, details are not described herein again.

It should be further understood that the numbers such as "first", "second", "third", and "fourth" included in this specification are merely for distinguishing purposes for ease of description, and are not intended to limit the scope of the embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects, unless specified otherwise.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of the present invention.

A person of ordinary skill in the art may be aware that the illustrative logical blocks and steps described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use a different method to implement the described function for each particular application, but it should not be considered that the implementation goes beyond the scope of the present invention.

It may be clearly understood by a person skilled in the art that for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate. Parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions in the embodiments of the present invention are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or a microwave) manner. The computer storage medium may be any usable medium accessible by the computer, or a data storage device, such as a server or a data center, into which one or more usable media are integrated. The usable medium may be a magnetic medium (for example, a floppy disk, a hard disk, or a magnetic tape), an optical medium (for example, a DVD), a semiconductor medium (for example, a Solid State Disk (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An exchange method, comprising:
   receiving, through a first interface, M bits;
   after receiving the M bits, receiving M bytes through the first interface, wherein each of the M bits indicates a status of a corresponding byte in the M bytes;
   encapsulating, based on the M bits corresponding to the M bytes, L bytes of the M bytes to obtain L encapsulated bytes, wherein M and L are integers greater than or equal to 1, and L is less than M;
   exchanging the L encapsulated bytes to a second interface;
   decapsulating the L encapsulated bytes to obtain L decapsulated bytes; and
   sending the L decapsulated bytes through the second interface.

2. The method according to claim 1 wherein the first interface is a first media independent interface, the first media independent interface comprises one receive control signal and S receive data signals, and S is an integer greater than 1;
   wherein the receiving M bytes through a first interface comprises:
      receiving the M bytes by using the S receive data signals; and
   wherein the receiving, through the first interface, M bits corresponding to the M bytes comprises:
      receiving, by using the one receive control signal, the M bits corresponding to the M bytes.

3. The method according to claim 2, wherein the receiving the M bytes by using the S receive data signals comprises:
   receiving T groups of bytes by using the S receive data signals, wherein T is an integer greater than or equal to 1, each group of bytes comprises S bytes, a product of S and T is M, and the T groups of bytes comprise a first group of bytes; and
   wherein the receiving, by using the one receive control signal, the M bits corresponding to the M bytes comprises:
      receiving T groups of bits by using the one receive control signal, wherein each group of bits comprises S bits, each of the T groups of bits corresponds to one of the T groups of bytes, the T groups of bits comprise a first group of bits, and the first group of bits corresponds to the first group of bytes.

4. The method according to claim 3, wherein the encapsulating L bytes of the M bytes to obtain L encapsulated bytes comprises:
   determining, based on the first group of bits corresponding to the first group of bytes, that a byte in the first group of bytes is a first type byte or a second type byte;
   encapsulating L1 first type bytes of the M bytes to obtain L1 encapsulated first type bytes, wherein L1 is an integer greater than or equal to 1, and L1 is less than M; and
   encapsulating L2 second type bytes of the M bytes to obtain L2 encapsulated second type bytes, wherein L2 is an integer greater than or equal to 1, and L2 is less than M.

5. The method according to claim 4, wherein the determining, based on the first group of bits corresponding to the first group of bytes, that a byte in the first group of bytes is a first type byte or a second type byte comprises:

if all bits in the first group of bits are low-order bits, determining that the byte in the first group of bytes is the first type byte, and
if the first group of bits comprises a high-order bit, determining that the byte in the first group of bytes is the second type byte; or
if all bits in the first group of bits are low-order bits, determining that the byte in the first group of bytes is the first type byte,
if the first group of bits comprises a high-order bit and if the first group of bytes comprises S bytes or T bytes, determining that the byte in the first group of bytes is the first type byte, and
if the first group of bits comprises a high-order bit and if the first group of bytes does not comprise the S bytes or the T bytes, determining that the byte in the first group of bytes is the second type byte; or
if all bits in the first group of bits are low-order bits, determining that the byte in the first group of bytes is the first type byte,
if the first group of bits comprises a high-order bit and if the first group of bytes comprises T bytes, determining that the byte in the first group of bytes is the first type byte, and
if the first group of bits comprises a high-order bit and if the first group of bytes does not comprise the T bytes, determining that the byte in the first group of bytes is the second type byte.

6. The method according to claim 4, wherein the L1 encapsulated first type bytes comprise at least one of frame header information, frame end information, intra-frame information, and sequence number information, and the L2 encapsulated second type bytes comprise at least one of sequence number information.

7. The method according to claim 4, wherein the exchanging the L encapsulated bytes to a second interface comprises:
exchanging the L1 encapsulated first type bytes to the second interface by using a first logical exchange plane; and
exchanging the L2 encapsulated second type bytes to the second interface by using a second logical exchange plane.

8. The method according to claim 4, wherein
the decapsulating the L encapsulated bytes to obtain L decapsulated bytes comprises:
decapsulating the L1 encapsulated first type bytes to obtain L1 decapsulated first type bytes and encapsulation information of the L1 first type bytes, and
decapsulating the L2 encapsulated second type bytes to obtain L2 decapsulated second type bytes and encapsulation information of the L2 second type bytes; and
wherein the sending the L decapsulated bytes through the second interface comprises:
sending the L1 decapsulated first type bytes and the L2 decapsulated second type bytes based on the encapsulation information of the L1 first type bytes and the encapsulation information of the L2 second type bytes through the second interface.

9. An exchange apparatus, comprising:
a first interface circuit, configured to receive M bits and M bytes through a first interface, wherein each of the M bits indicates a status of a corresponding byte in the M bytes, and to encapsulate, based on the M bits corresponding to the M bytes, L bytes of the M bytes to obtain L encapsulated bytes, wherein M and L are integers greater than or equal to 1, and L is less than M;
an exchange circuit, configured to exchange the L encapsulated bytes to a second interface circuit; and
the second interface circuit, configured to decapsulate the L encapsulated bytes to obtain L decapsulated bytes, and send the L decapsulated bytes through a second interface.

10. The exchange apparatus according to claim 9, wherein the first interface is a first media independent interface, the first media independent interface comprises one receive control signal and S receive data signals, and S is an integer greater than 1;
the first interface circuit is configured to receive the M bytes by using the S receive data signals; and
the first interface circuit is configured to receive, by using the one receive control signal, the M bits corresponding to the M bytes.

11. The exchange apparatus according to claim 10, wherein
the first interface circuit is configured to receive T groups of bytes by using the S receive data signals, wherein T is an integer greater than or equal to 1, each group of bytes comprises S bytes, a product of S and T is M, and the T groups of bytes comprise a first group of bytes; and
the first interface circuit is configured to receive T groups of bits by using the one receive control signal, wherein each group of bits comprises S bits, each of the T groups of bits corresponds to one of the T groups of bytes, the T groups of bits comprise a first group of bits, and the first group of bits corresponds to the first group of bytes.

12. The exchange apparatus according to claim 11, wherein
the first interface circuit is configured to determine, based on the first group of bits corresponding to the first group of bytes, that a byte in the first group of bytes is a first type byte or a second type byte; encapsulate L1 first type bytes of the M bytes to obtain L1 encapsulated first type bytes, wherein L1 is an integer greater than or equal to 1, and L1 is less than M; and encapsulate L2 second type bytes of the M bytes to obtain L2 encapsulated second type bytes, wherein L2 is an integer greater than or equal to 1, and L2 is less than M.

13. The exchange apparatus according to claim 12, wherein
the first interface circuit is configured to: if all bits in the first group of bits are low-order bits, determine that the byte in the first group of bytes is the first type byte, and if the first group of bits comprises a high-order bit, determine that the byte in the first group of bytes is the second type byte; or
the first interface circuit is configured to: if all bits in the first group of bits are low-order bits, determine that the byte in the first group of bytes is the first type byte, if the first group of bits comprises a high-order bit and if the first group of bytes comprises S bytes or T bytes, determine that the byte in the first group of bytes is the first type byte, and if the first group of bits comprises a high-order bit and if the first group of bytes does not comprise the S bytes or the T bytes, determine that the byte in the first group of bytes is the second type byte; or
the first interface circuit is configured to: if all bits in the first group of bits are low-order bits, determine that the byte in the first group of bytes is the first type byte, if the first group of bits comprises a high-order bit and if the first group of bytes comprises T bytes, determine that the byte in the first group of bytes is the first type byte, and if the first group of bits comprises a high-order bit and if the first group of bytes does not comprise the T bytes, determine that the byte in the first group of bytes is the second type byte.

14. The exchange apparatus according to claim 12, wherein the L1 encapsulated first type bytes comprise at least one of frame header information, frame end information, intra-frame information, and sequence number information, and the L2 encapsulated second type bytes comprise at least one of sequence number information.

15. The exchange apparatus according to claim 12, wherein the exchange circuit is configured to exchange the L1 encapsulated first type bytes to the second interface by using a first logical exchange plane; and exchange the L2 encapsulated second type bytes to the second interface by using a second logical exchange plane.

16. The exchange apparatus according to claim 12, wherein the second interface circuit is configured to decapsulate the L1 encapsulated first type bytes to obtain L1 decapsulated first type bytes and encapsulation information of the L1 first type bytes, and decapsulate the L2 encapsulated second type bytes to obtain L2 decapsulated second type bytes and encapsulation information of the L2 second type bytes; and the second interface circuit is configured to send the L1 decapsulated first type bytes and the L2 decapsulated second type bytes based on the encapsulation information of the L1 first type bytes and the encapsulation information of the L2 second type bytes through the second interface.

* * * * *

UNITED STATES PATENT AND TRADEMARK OFFICE
CERTIFICATE OF CORRECTION

PATENT NO. : 11,290,578 B2
APPLICATION NO. : 16/802977
DATED : March 29, 2022
INVENTOR(S) : Xiaojun Zhang et al.

It is certified that error appears in the above-identified patent and that said Letters Patent is hereby corrected as shown below:

In the Claims

In Column 16 Line 21, In Claim 2, delete "claim 1" and insert -- claim 1, --.

Signed and Sealed this
Sixteenth Day of August, 2022

Katherine Kelly Vidal
*Director of the United States Patent and Trademark Office*